US 7,583,624 B2

(12) United States Patent
Wang et al.

(10) Patent No.: US 7,583,624 B2
(45) Date of Patent: Sep. 1, 2009

(54) METHOD OF IDLE MODE CONTROL IN OFDM SYSTEM

(75) Inventors: Yang Wang, Shanghai (CN); Yan Wan, Shanghai (CN)

(73) Assignee: ALCATEL, Paris (FR)

( * ) Notice: Subject to any disclaimer, the term of this patent is extended or adjusted under 35 U.S.C. 154(b) by 694 days.

(21) Appl. No.: 10/981,497

(22) Filed: Nov. 5, 2004

(65) Prior Publication Data

US 2005/0099988 A1    May 12, 2005

(30) Foreign Application Priority Data

Nov. 7, 2003   (CN)   .................... 2003 1 0108497

(51) Int. Cl.
*G08C 17/00* (2006.01)
*H04L 5/04* (2006.01)
(52) U.S. Cl. .................... 370/311; 370/203; 370/208; 370/343
(58) Field of Classification Search .................. 455/574; 370/312, 319, 342, 343, 311, 208, 509; 375/260
See application file for complete search history.

(56) References Cited

U.S. PATENT DOCUMENTS

| | | | |
|---|---|---|---|
| 5,452,288 A | | 9/1995 | Rahuel |
| 6,058,289 A | | 5/2000 | Gardner |
| 6,075,814 A | * | 6/2000 | Yamano et al. ............. 455/574 |
| 6,108,369 A | * | 8/2000 | Ovesjo et al. ............... 375/146 |
| 6,201,966 B1 | * | 3/2001 | Rinne et al. ................. 455/434 |
| 2003/0190937 A1 | * | 10/2003 | Karmi et al. ................ 455/574 |
| 2003/0193970 A1 | * | 10/2003 | Kim et al. ................... 370/509 |

OTHER PUBLICATIONS

Santashil PalChaudhuri et al, "Power Mode Scheduling for Ad Hoc Networks", Proceedings of the $10^{TH}$ IEEE International Conference on Network Protocols (ICNP'02), Computer Society, 2002 IEEE.
U.S. Appl. No. 10/747,186, filed Dec. 30, 2003, entitled "Method and Transceiver Apparatus for Transmitting Paging Information in Orthogonal Frequency-Division Multiplexing Systems".

* cited by examiner

*Primary Examiner*—Lester Kincaid
*Assistant Examiner*—Daniel Lai
(74) *Attorney, Agent, or Firm*—Sughrue Mion, PLLC

(57) ABSTRACT

The present invention discloses a method of idle mode control in an orthogonal frequency-division multiplexing (OFDM) system. By superposing idle mode control channels on a frame synchronization pattern in the frame header of an OFDM frame, mobile terminals at a low migration rate will be switched into idle mode during packet service transmission intermission period. The mobile terminals in idle mode needn't do FFT to check whether there is any packet to be received after receiving every frame, thereby the power energy of the mobile terminals is greatly saved.

15 Claims, 3 Drawing Sheets

METHOD OF IDLE MODE CONTROL IN OFDM SYSTEM

CROSS-REFERENCE TO RELATED APPLICATION(S)

This application is based on the Chinese Patent Application No. 200310108497.0 filed on Nov. 7, 2003, the disclosure of which is hereby incorporated by reference thereto in its entirety, and the priority of which is hereby claimed under 35 U.S.C. §119.

FIELD OF THE INVENTION

The present invention relates to a mobile communication system, and more particularly, to a method of idle mode control in an orthogonal frequency-division multiplexing (OFDM) system.

BACKGROUND OF THE INVENTION

At present, data transmission between an access point (AP) and a mobile terminal (MT) is in the form of frame during the packet transmission of a mobile communication system (e.g., OFDM system). For example, a US patent entitled Device and method for symbol frame synchronization of OFDM transmitter and receiver with the publication number of 20030193970 disclosed a frame structure. As shown in FIG. 1, the frame includes frame synchronization pattern (FSP), which is inserted into the starting portion of the frame for use of frame synchronization, and OFDM symbols following thereafter, which includes guard interval (GI) and synchronization pattern (Sync1, Sync2) or includes guard interval and data (data 1, data 2 . . . ). In a mobile communication system, every time the MT receives a frame, it must do Fast Fourier Transform (FFT) to demodulate the Time-Frequency Units Allocation Channel to check whether there is any packet to be received, which causes unnecessary power consumption and battery life shorten of mobile terminals in the system because of the high complexity of FFT.

SUMMARY OF THE INVENTION

It is an object of the present invention to put forward a method of idle mode control in an orthogonal frequency-division multiplexing (OFDM) system, wherein the AP superposes at least one idle mode control channel on the frame synchronization pattern in the frame header of the OFDM frame, then transmits information which determines whether the MT should enter an idle mode or an activate mode in said idle mode control channel, and transmits the frame to the MT. Every time the MT receives a frame, the MT detects idle mode control channels in the frame header of the frame and acquires information therein which determines whether the MT should switch into idle mode in the packet service transmission intermission interval. The Mobile Terminal in the idle mode needn't do FFT upon the receipt of every frame, thus the power consumption of the mobile terminal is greatly saved.

The above-mentioned superposing method is as follows: spreading idle mode control channels by using channelisation codes to obtain idle mode control channels that are orthogonalized each other; summating all the idle mode control channels that are orthogonalized each other; multiplying the above summating results by frame synchronization patterns sent from a frame synchronization pattern generator; adding the multiplying results to the frame synchronization patterns. Thus obtaining a frame improved by superposing idle mode control channels on frame synchronization patterns.

Advantages of the present invention are that, using the method of the present invention, the Mobile Terminal needn't do Fast Fourier Transform upon the receipt of every frame in the packet service transmission intermission interval, thereby saving the power and prolonging the battery life of Mobile Terminals (MT).

BRIEF DESCRIPTION ON THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

The present invention will be described in detail with reference to the accompanying drawings and the preferred embodiments.

The idle mode of the present invention is packet-service-oriented, i.e., the MT is still kept in connected-mode, but not receiving or demodulating any downlink signals during the packet transmission intermission interval, thus the power is saved. Hence, this idle mode control mechanism is packet-service-oriented.

First Embodiment

Figure 1:
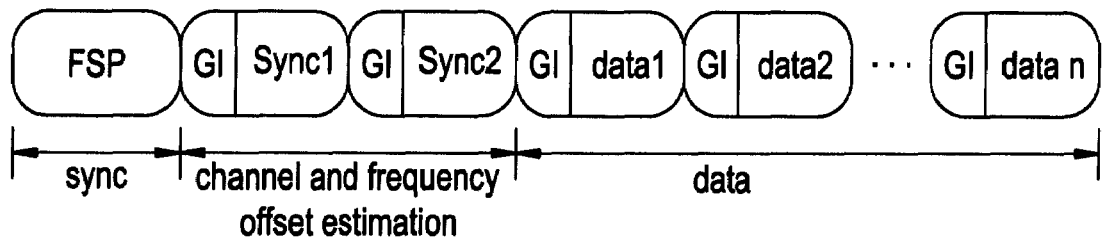
FIG. 1 is an existing OFDM frame structure.
Figure 2:
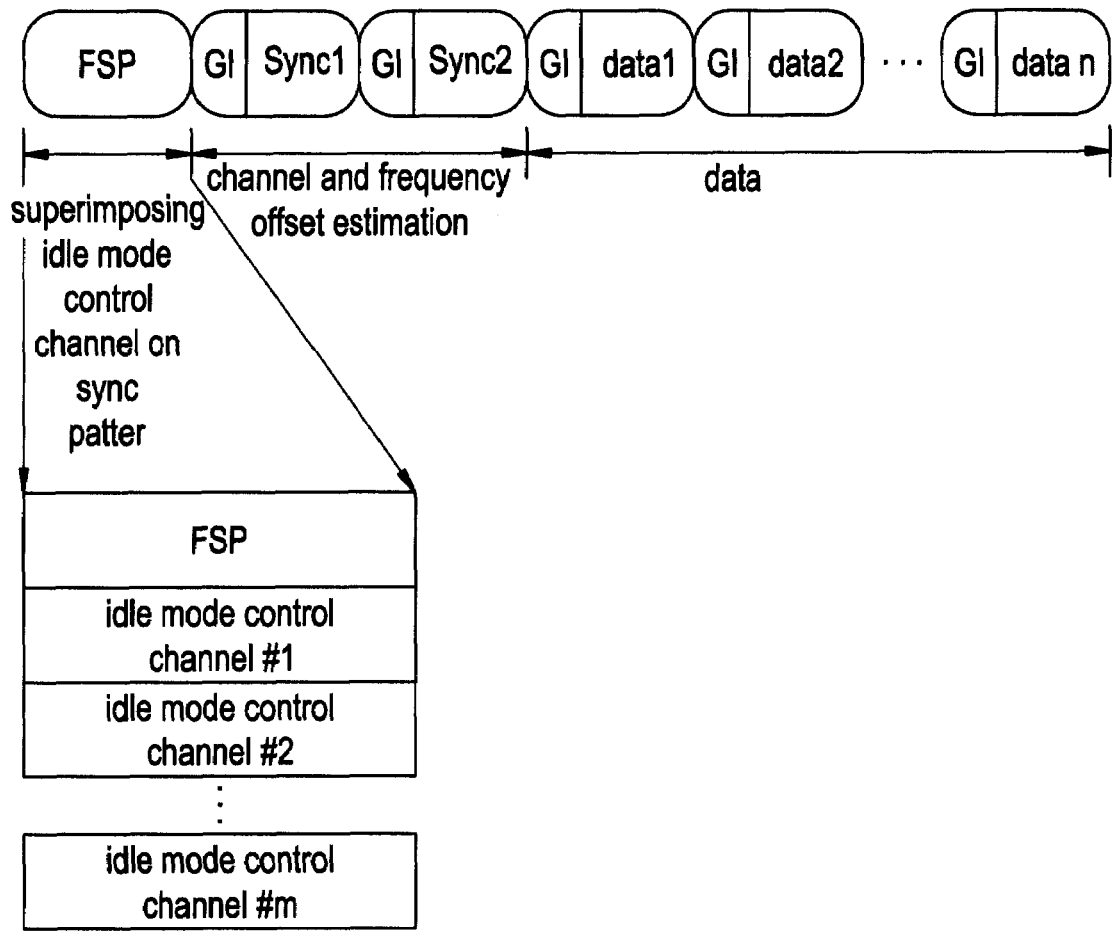
FIG. 2 is an OFDM frame structure according to one embodiment of the present invention.

FIG. 2 is an OFDM frame structure according to one embodiment of the present invention. An OFDM frame includes a frame header and a number of OFDM symbols. The frame header includes a frame synchronization pattern (FSP) that may be a pseudo-noise (PN) pattern or other binary pattern with good coherence. The AP superposes m idle mode control channels on a frame synchronization pattern in the frame header of each OFDM frame, wherein m>=1 and may be determined in accordance with the system's requirements.

Figure 3:
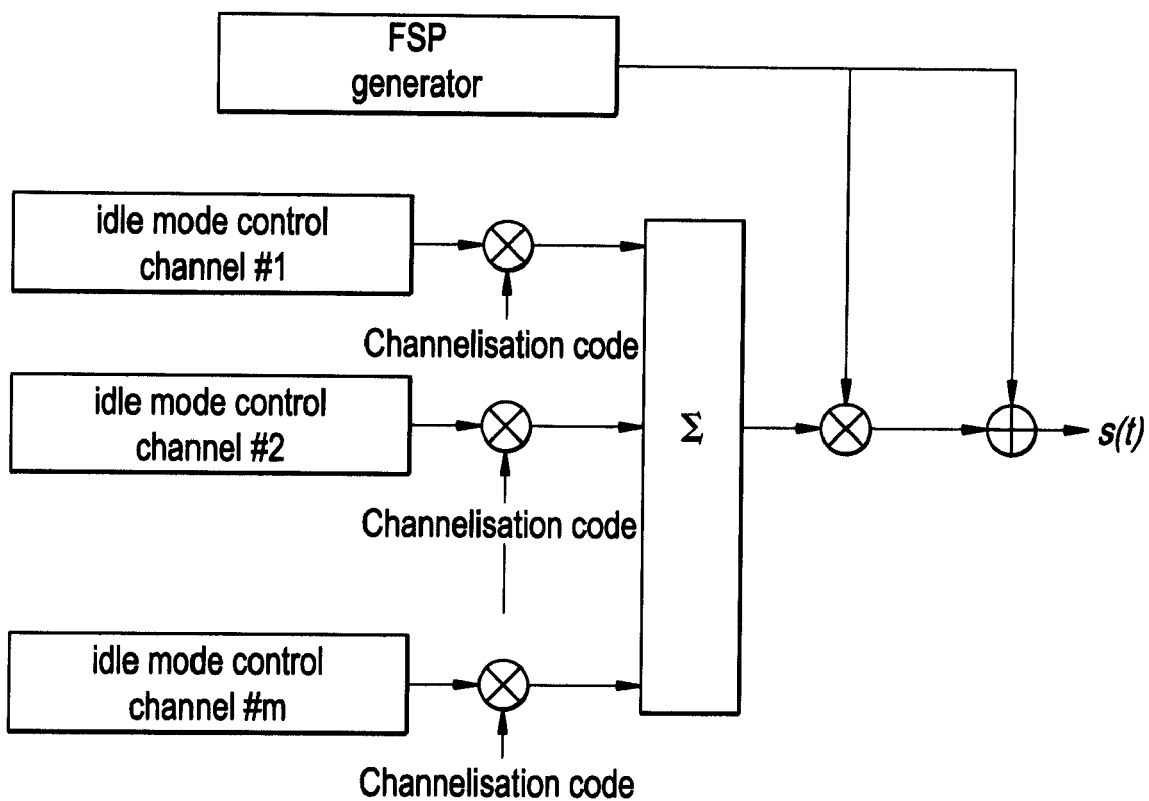
FIG. 3 is a structure of idle mode control channels according to one embodiment of the present invention.

FIG. 3 is a structure of idle mode control channels according to one embodiment of the present invention, which explains the process of how to superpose a number of idle mode control channels on a frame synchronization pattern. Firstly, in step a1, spreading idle mode control channels by using channelisation codes and obtaining idle mode control channels that are orthogonalized each other to differentiate each idle mode control channel, such as idle mode control channel 1, idle mode control channel 2, . . . , idle mode control channel m . . . ; Secondly, in step a2, summating all the idle mode control channels that are orthogonalized each other to obtain summating results; Thirdly, in step 3, multiplying a frame synchronization pattern generated by a frame synchronization pattern generator by the sum obtained in step a2; And lastly, adding the results obtained in step a3 to the frame synchronization pattern. Thus superposing idle mode control channels on a frame synchronization pattern is finished and an improved frame structure is obtained.

In the present embodiment, after the m idle mode control channels that are orthogonalized each other are superposed on the frame synchronization pattern, they are allocated by a radio-resource-control (RRC) layer at the AP side in accordance with the system's needs so as to be divided into Idling Channels and Activating Channels shared by all users in a cell.

Figure 4:
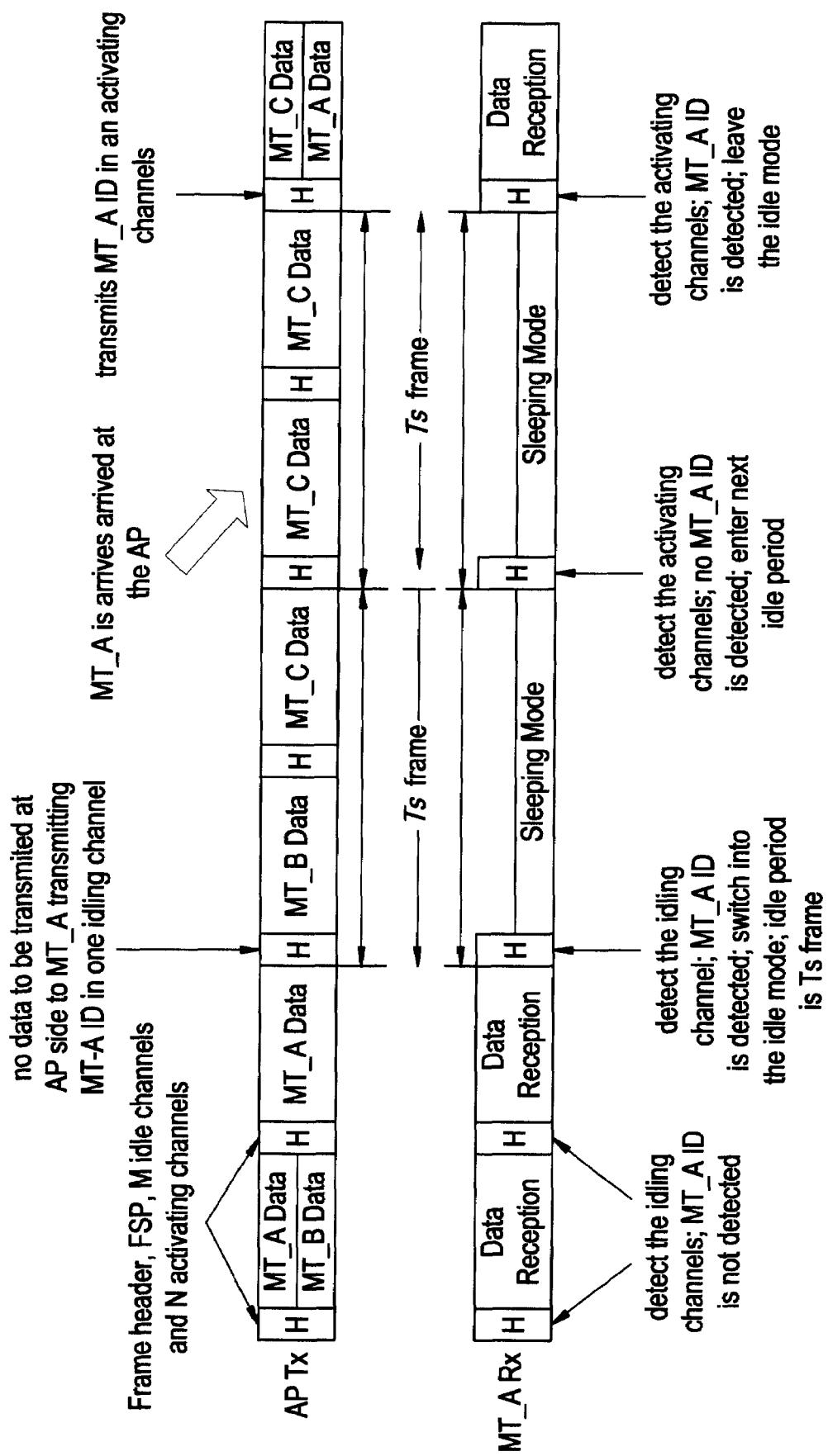
FIG. 4 is an explanatory diagram showing an idle mode control method according to one embodiment of the present invention.

FIG. 4 is an explanatory drawing of an idle mode control method according to one embodiment of the present invention. The AP is capable of performing in each frame idle mode control on a plurality of MTs. For the purpose of concision, FIG. 4 only shows the process that the AP performs idle mode control on a certain MT. When the AP determines a certain MT shall be switched into idle mode or activate mode, it transmits the MT_ID of the MT in the idle mode control channels. AP_Tx represents OFDM frame transmitted at the AP side, H represents frame header which includes a frame synchronization pattern, M idling channels and N activating channels. When a first frame contains data to be transmitted to the Mobile Terminal A (MT_A) and data to be transmitted to the Mobile Terminal B (MT_B) and supposing that the original state of the MT_A and MT_B is an activate state, the AP does not transmit in the idle mode control channels information determining the two mobile terminals (MT_A and MT_B) shall enter idle mode or active mode and transmits the first frame to MT_A. MT_A Rx is a frame received by MT_A. MT_A detects idling channels in the frame header of the received frame MT_A Rx. If its MT_A ID is not detected in the idling channels, the Mobile Terminals still keeps activate state. When transmitting the third frame, there is no data to be transmitted at AP side to MT_A, then the AP transmits MT-A ID in one idling channel and transmits the third frame to MT_A. When MT_A receives the frame, it detects idling channels with respect to the frame header and its MT_A ID is detected in the idling channels, then, the Mobile Terminal is switched into idle mode. The idle period is Ts frames, where the Access Point assigns different idle periods Ts to mobile terminals in accordance with their different needs of quality of service (QoS). Ts may be one or several frame periods. After the idle period Ts, MT_A detects the frame header of the received frame. If no MT_A ID is detected in the activating channels, then the Mobile Terminal enters next idle period. Afterwards, when data to be transmitted to MT_A is arrived at the AP, the AP, after MT_A ends the current idle period, transmits MT_A ID in the activating channels of the frame header and transmits it to MT_A. Upon the receipt, the MT_A detects the activating channels in the frame header and its MT_A ID is detected, then, the Mobile Terminal leaves the idle mode, enters activate mode, demodulates the Time-Frequency Units Allocation Channel, and does FFT to demodulate data under the control of Time-Frequency Units Allocation Channel.

Second Embodiment

The present embodiment is basically similar with the first embodiment. The main difference between them is that, after at least one idle mode control channels is superposed on the frame synchronization pattern of OFDM frame, each idle mode channel is allocated an MT_ID which respectively corresponds to MT using packet service so that each MT using packet service has a Dedicated Idle Mode Control Channel. Thus, the idle mode control channels here are not divided into Idling Channels and Activating Channels. If the AP determines a certain MT shall enter idle mode, the AP shall transmit idle code "0" in the MT's Dedicated Idle Mode Control Channel of the frame header. If the AP determines a certain MT shall enter activate mode, the AP shall transmit activate code "1" in the MT's Dedicated Idle Mode Control Channel of the frame header. Correspondingly, when the MT detects the frame header of the received frame, if idle code "0" is detected in its Dedicated Idle Mode Control Channel, the MT shall enter idle mode; if activate code "1" is detected, the MT shall enter activate mode. However, the person skilled in the art should be appreciated that wherein "0" or "1" is just illustrational and can be applied vice verse in the above application, or other codes other than "0" or "1" can be applied.

In the present embodiment, "0" or "1" can be transmitted with higher repetition factor. Hence, compared with the first embodiment, the present embodiment has higher reliability and is more robust to interference, and MT needn't detect and despread all the Idle Mode Control Channels.

As the present invention has been described with reference to the preferred embodiments, many substitutes, modifications and variations are obvious to those skilled in the art according to the foregoing description. Therefore, the present invention will include all such substitutes, modifications and variations that fall under the concept and the scope of the appended claims.

What is claimed is:

1. A method of idle mode control in an orthogonal frequency-division multiplexing system, said method comprising:
   a) Access Point (AP) superposing m idle mode control channels on a frame synchronization pattern in the frame header of an orthogonal frequency-division multiplexing (OFDM) frame, m >=1;
   b) the AP transmitting in said idle mode control channels information determining whether a Mobile Terminal (MT) shall enter idle mode or activate mode and sending said frame to a mobile terminal (MT);
   c) the MT receiving said frame and entering idle mode or activate mode in accordance with said information in said idle mode control channels.

2. A method as claimed in claim 1, wherein said superposing m idle mode control channels on a frame synchronization pattern comprises:
   a1) spreading idle mode control channels by using channelisation codes to obtain idle mode control channels that are orthogonalized with each other;
   a2) summating all the idle mode control channels that are orthogonalized with each other to obtain the summating results;
   a3) multiplying frame synchronization patterns transmitted from a frame synchronization pattern generator by the summating results obtained in step a2;
   a4) adding the results obtained in step a3 to the frame synchronization patterns to obtain a frame having superposed idle mode control channels on frame synchronization patterns.

3. A method as claimed in claim 2, wherein said idle mode control channels that are orthogonalized with each other are allocated by a radio-resource-control (RRC) layer at the AP side in accordance with the system's requirements so as to be divided into Idling Channels and Activating Channels shared by all users in a cell.

4. A method as claimed in claim 3, wherein said transmitting information determining whether the MT shall enter idle mode or activate mode is to transmit Identification of said MT (MT_ID) in the control channels corresponding to the mode which the MT is to be enter.

5. A method as claimed in claim 4, wherein the MT in activate mode detects all idling channels every time it receives a frame, and if its MT_ID is detected, the MT enters idle mode.

6. A method as claimed in claim 5, wherein the MT in idle mode detects all activating channels every one idle period, and if its MT_ID is detected, the MT leaves the idle mode, demodulate Time-Frequency Units Allocation Channel and does FFT to demodulate packet data under the control of the Time-Frequency Units Allocation Channel; if its MT_ID is not detected, the MT enters next idle period.

7. A method as claimed in claim 2, wherein each of said idle mode control channels that are orthogonalized with each other is allocated an MT_ID by a radio-resource-control (RRC) layer at the AP side in accordance with the system's requirements, said MT_ID corresponds to each MT using packet service so that each MT using packet service has a Dedicated Idle Mode Control Channel.

8. A method as claimed in claim 7, wherein said transmitting information determining whether the MT shall enter idle mode or activate mode is to transmit the MT's idle codes or activate codes in the MT's Dedicated Control Channel.

9. A method as claimed in claim 8, wherein the MT in activate mode detects its Dedicated Idle Mode Control Channel every time it receives a frame, and if idle code is detected, the MT enters idle mode.

10. A method as claimed in claim 9, wherein the MT in idle mode detects its Dedicated Idle Mode Control Channel at the end of each idle period; if activate code is detected, the MT leaves the idle mode, demodulate Time-Frequency Units Allocation Channel and does FFT to demodulate packet data under the control of the Time-Frequency Units Allocation Channel; if activate code is not detected, the MT enters next idle period.

11. A method as claimed in claim 1, wherein the middle mode control channels are orthogonalized with each other.

12. A method as claimed in claim 1, wherein when the MT enters the idle mode, the MT is idle for a period of frames.

13. A method as claimed in claim 12, wherein the period of frames is assigned by the AP in accordance with their different needs of quality of service.

14. A method as claimed in claim 1, wherein each of the idle mode control channels is allocated a MT identification which correspond to the MT using packet service so that the Mobile Terminal using packet service has a Dedicated Mode Control Channel.

15. A method as claimed in claim 14, wherein if the AP determines that the MT will enter idle mode, the AP will transmit idle codes in the Dedicated Mode Control Channel, and if the AP determines that the MT will enter active mode, the AP will transmit activate codes in the Dedicated Mode Control Channel.

* * * * *